US012772139B2

(12) United States Patent
Parikh et al.

(10) Patent No.: US 12,772,139 B2
(45) Date of Patent: Oct. 20, 2026

(54) FAR ID PROVISIONING DURING DEDICATED BEARER CREATION

(71) Applicant: Parallel Wireless, Inc., Nashua, NH (US)

(72) Inventors: Ketan Parikh, Pune (IN); Nikhil Agarwal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/170,167

(22) Filed: Feb. 8, 2021

(65) Prior Publication Data

US 2021/0250839 A1 Aug. 12, 2021

Related U.S. Application Data

(60) Provisional application No. 62/971,563, filed on Feb. 7, 2020.

(51) Int. Cl.

*H04W 76/12* (2018.01)
*H04W 40/02* (2009.01)
*H04W 88/16* (2009.01)

(52) U.S. Cl.

CPC ........... *H04W 40/02* (2013.01); *H04W 76/12* (2018.02); *H04W 88/16* (2013.01)

(58) Field of Classification Search

CPC ..... H04W 40/02; H04W 76/12; H04W 88/16; H04W 28/12

See application file for complete search history.

(56) References Cited

U.S. PATENT DOCUMENTS

| | | | | |
|---|---|---|---|---|
| 2020/0059992 A1* | 2/2020 | Skog | ........................ | H04L 45/38 |
| 2020/0213909 A1* | 7/2020 | Oh | ........................ | H04L 12/1407 |
| 2020/0404739 A1* | 12/2020 | Thiebaut | ............... | H04W 76/40 |
| 2021/0176808 A1* | 6/2021 | Zhu | ........................ | H04W 76/22 |

FOREIGN PATENT DOCUMENTS

| | | | | |
|---|---|---|---|---|
| WO | WO-2020085654 A1 * | 4/2020 | ............. | H04L 45/74 |
| WO | WO-2020093878 A1 * | 5/2020 | ............. | H04L 12/14 |

OTHER PUBLICATIONS

LTE; 5G; Interface between the Control Plane and the User Plane nodes (3GPP TS 29.244 version 15.8.0 Release 15) (Jan. 2020).

* cited by examiner

*Primary Examiner* — Lakeram Jangbahadur

(74) *Attorney, Agent, or Firm* — Michael Y. Saji; Ashish Patel

(57) ABSTRACT

Methods, computer-readable medium and a system are described for handling data traffic during Dedicated Bearer creation at a Packet Gate Way (PGW). In one embodiment, a method includes receiving, at a PGW user plane from a PGW control plane, a PFCP session modify request; creating a PDR-id (P1); sending, from the user plane to the control plane, a PFCP session modify response; receiving, at the control plane, downlink data matching PDR(P1); and performing at least one of allowing data since FAR(Fx) has a forwarding parameter, and sending data to peer node as per FAR (F1) forwarding parameters.

3 Claims, 6 Drawing Sheets

200

FAR ID PROVISIONING DURING DEDICATED BEARER CREATION

CROSS-REFERENCE TO RELATED APPLICATIONS

This application claims priority under 35 U.S.C. § 119(e) to U.S. Provisional Pat. App. No. 62/971,563, filed Feb. 7, 2020, titled "FAR ID Provisioning During Dedicated Bearer Creation" which is hereby incorporated by reference in its entirety for all purposes. The present application hereby incorporates by reference each of U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019. In addition. ETSI TS 129.244 (also known as 3GPP TS 29.244), v. 15.8.0 (January 2020), is also hereby incorporated by reference in its entirety for all purposes.

BACKGROUND

CUPS (control and user plane separation) is a principle for the RAN and core network of 3GPP 4G and 5G networks. A Forwarding Action Rule (FAR) is part of packet forwarding as specified by 3GPP TS 29.244. The CP function controls the packet processing in the UP function by establishing, modifying or deleting PFCP Session contexts and by provisioning (i.e. adding, modifying or deleting) PDRs, FARs, QERs, URRs and/or BAR per PFCP session context) (TS 39.355 § 5.2.1).

A PFCP session context may refer to, for EPC, to an individual PDN connection, a TDF session, or a standalone session not tied to any PDN connection or TDF session used e.g. for forwarding Radius, Diameter or DHCP signalling between the PGW-C and the PDN; or, for 5GC, to an individual PDU session or a standalone PFCP session not tied to any PDU session.

As per 3gpp Control and User plane separation (CUPS) specifications, GPTU TEID allocation can be done at control-plane as well as at user-plane.

SUMMARY

This invention proposes a mechanism for efficient handling of data traffic at PGW while new dedicated bearer creation procedure is in progress when GTPU TEID allocation is done at User-plane.

In one embodiment, a method for handling data traffic during Dedicated Bearer creation at a Packet Gate Way (PGW) includes receiving, at a PGW user plane from a PGW control plane, a PFCP session modify request; creating a PDR-id (P1); sending, from the user plane to the control plane, a PFCP session modify response; receiving, at the control plane, downlink data matching PDR(P1); and performing at least one of allowing data since FAR(Fx) has a forwarding parameter, and sending data to peer node as per FAR (F1) forwarding parameters.

In another embodiment, a compute readable medium includes instructions for handling data traffic during Dedicated Bearer creation at a Packet Gate Way (PGW) which, when executed, cause the PGW to perform steps comprising: receiving, at a PGW user plane from a PGW control plane, a PFCP session modify request; creating a PDR-id (P1); sending, from the user plane to the control plane, a PFCP session modify response; receiving, at the control plane, downlink data matching PDR(P1); and performing at least one of allowing data since FAR(Fx) has a forwarding parameter, and sending data to peer node as per FAR (F1) forwarding parameters.

In another embodiment a Packet Gate Way (PGW) for handling data traffic during Dedicated Bearer creation is described. The system receives, at a PGW user plane from a PGW control plane, a PFCP session modify request; creates a PDR-id (P1); sends, from the user plane to the control plane, a PFCP session modify response; receives, at the control plane, downlink data matching PDR(P1); and performs at least one of allowing data since FAR(Fx) has a forwarding parameter, and sending data to peer node as per FAR (F1) forwarding parameters.

DETAILED DESCRIPTION

For Packet Gate Way (PGW) Control-plane and User-plane interaction for Dedicated Bearer Creation when General Tunneling Protocol Unit (GTPU) Tunnel End-Point Identifier (TEID) allocation is done at User-plane: 1. PGW Control-plane sends Packet Forwarding Control Protocol (PFCP) Session modification request with following Information elements (IEs). 1.1 Create PDR (P): This is required for allocation of local GPTU TEID to be communicated in Create Bearer Request; 1.2. The PDR (P) shall contain Forwarding Action Rules Identifier (FAR ID) which defines the Forwarding Action Rules (FAR) to be applied on traffic matching this PDR (P).

Figure 1:
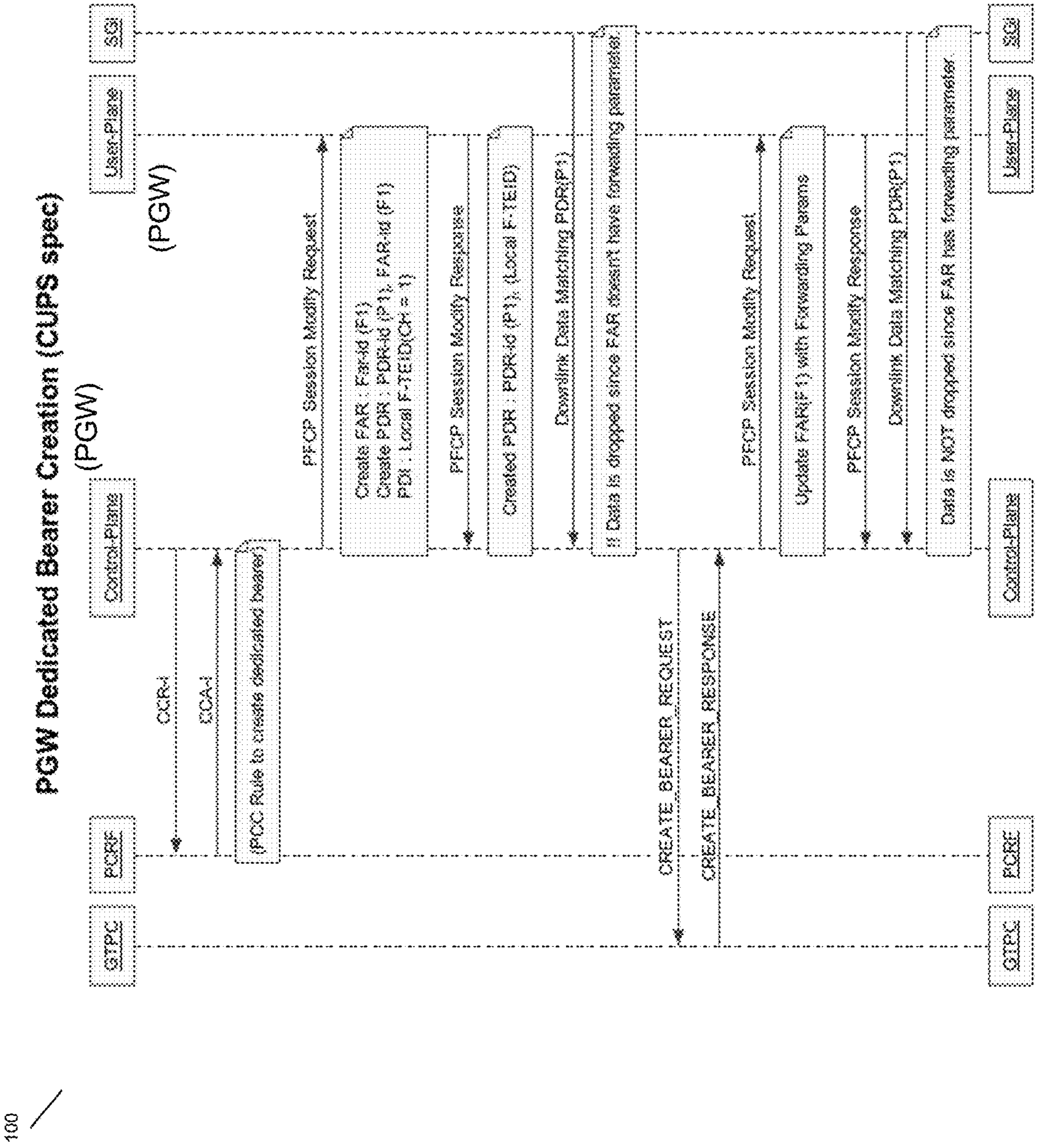
FIG. 1 is a call flow diagram showing dedicated bearer creation.

In some cases where FAR is created at the user plane, this FAR of PDR(P) may not have remote endpoint information (Forwarding Parameters) until a Create Bearer Response is received at PGW with the required parameter. Since PDR is now installed with Service Data flow (SDF) Filters (packet filters) on User-plane, any traffic matching this PDR would get dropped as Forwarding parameters are not yet updated, for example during load conditions, or requires expensive queuing. This is shown in the call flow diagram 100 of FIG. 1.

Figure 2:
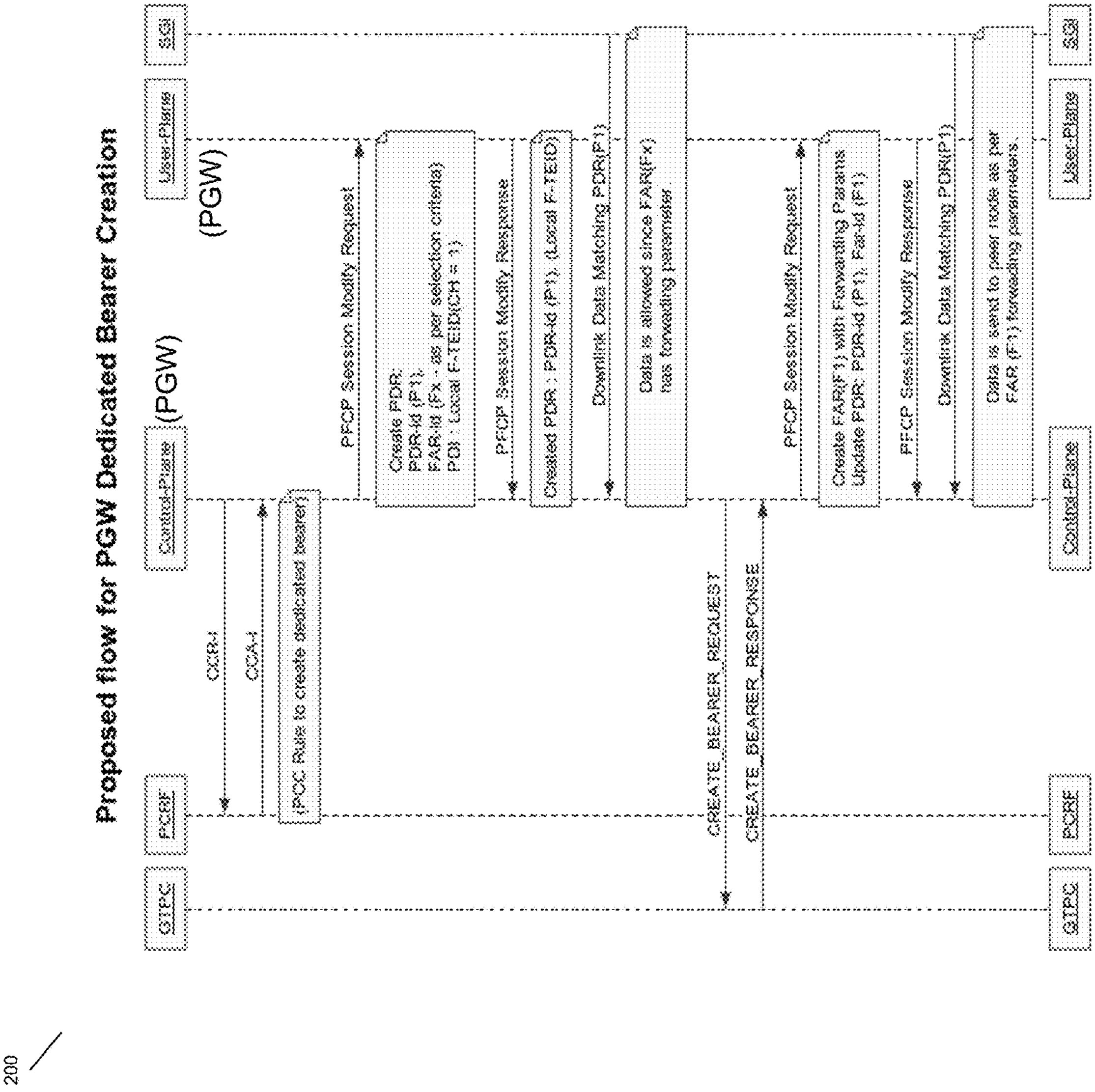
FIG. 2 is a call flow diagram showing a dedicated bearer creation, in accordance with some embodiments.

As shown in FIG. 2, the presently described FAR ID provisioning during dedicated bearer creation call flow 200 is that Control-plane, while installing new PDR(P) during Create Bearer Request, shall provision FAR ID of one of the installed FARs on the session.

Criteria to select suitable FAR.

Control plane shall select FAR ID corresponding to or based on the existing PDRs through which data traffic matching the SDF filters of the new PDR(P) was passing through before new PDR installation.

FAR can be updated once the CREATE_BEARER_RESPONSE is received at the PGW with new forwarding parameters.

The dedicated bearer creation method described herein can be used with a 5G architecture which can include either or both of standalone (SA) and non-standalone (NSA) scenarios, in some embodiments. A SA scenario is 5G from end to end, using 5G cells for both signaling and information transfer. The SA scenario includes a 5G packet core architecture instead of relying on the 4G Evolved Packet Core (EPC). This allows the deployment of 5G without using an LTE network. In an NSA scenario the 5G networks will be supported by existing 4G infrastructure. For example, 5G-enabled smartphones will connect to 5G frequencies for data-throughput improvements but will still use 4G for non-data duties such as talking to the cell towers and servers.

The present method is better than various alternatives, as follows

1. In the alternative that User-Plane could choose not to install this PDR till Create Bearer procedure is complete. But for this to work, there has to be some non-spec understanding between User-plane and Control-plane. Possibly using some encoded information. This might not work when C-Plane and U-plane have to work independently and are from different vendors.
2. In the alternative where matching traffic for that PDR is simply dropped until FAR is provisioned after Create Bearer Response is received, this will lead to service disruptions as there might be network delays and will not be good solution.
3. In another alternative, a proprietary/custom IE could be used to control the behavior till tunnels are actually established. This will again restrict C-plane and U-plane to work independently, especially restricting multi-vendor interoperability.

Figure 3:
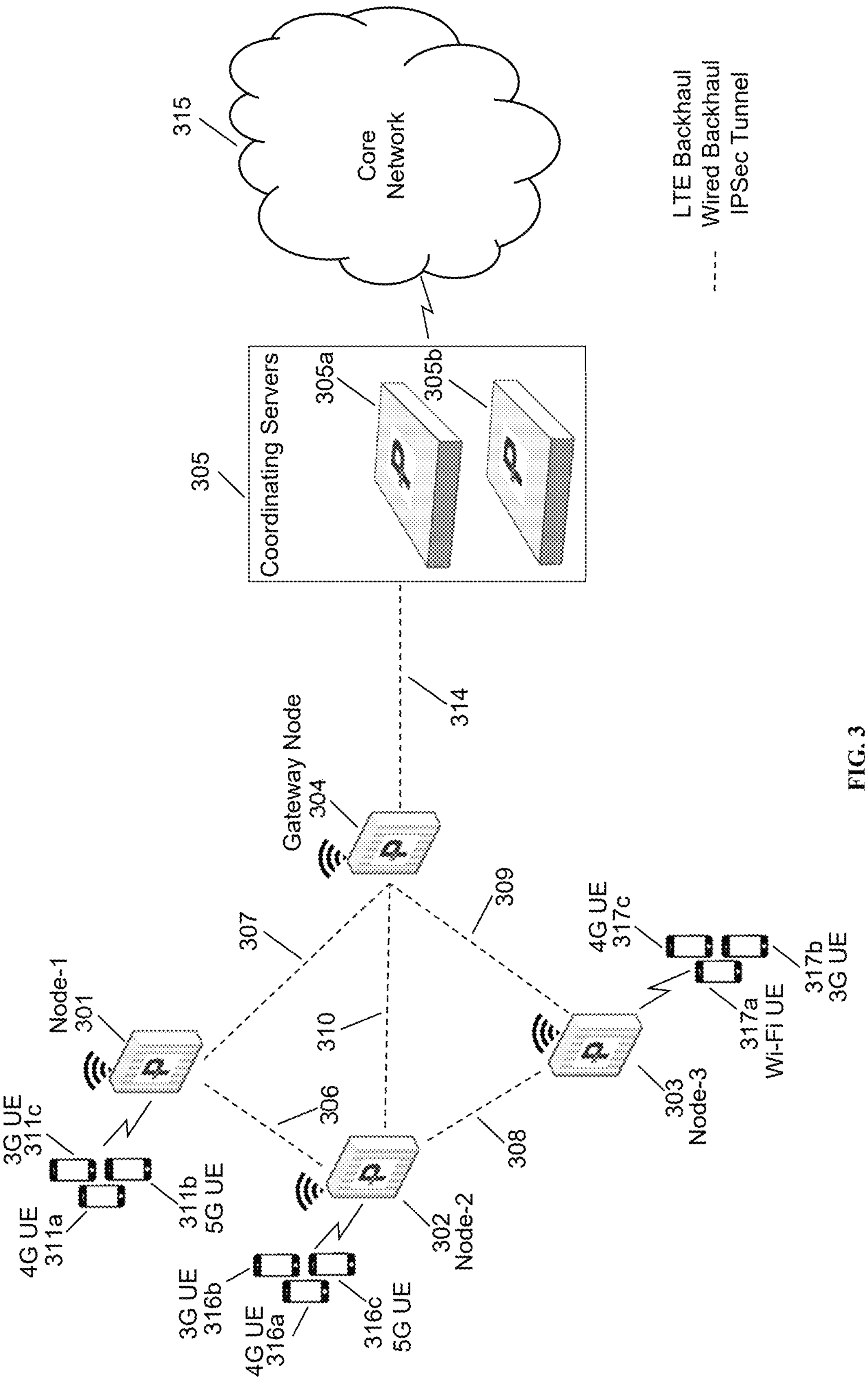
FIG. 3 is a diagram showing an architecture diagram, in accordance with some embodiments.

FIG. 3 a network diagram in accordance with some embodiments. In some embodiments, as shown in FIG. 3, a mesh node 1 301, a mesh node 2 302, and a mesh node 3 303 are any G RAN nodes. Base stations 101, 302, and 303 form a mesh network establishing mesh network links 306, 307, 308, 309, and 310 with a base station 304. The mesh network links are flexible and are used by the mesh nodes to route traffic around congestion within the mesh network as needed. The base station 304 acts as gateway node or mesh gateway node, and provides backhaul connectivity to a core network to the base stations 301, 302, and 303 over backhaul link 314 to a coordinating server(s) 305 and towards core network 315. The Base stations 301, 302, 303, 304 may also provide eNodeB, NodeB, Wi-Fi Access Point, Femto Base Station etc. functionality, and may support radio access technologies such as 2G, 3G, 4G, 5G, Wi-Fi etc. The base stations 301, 302, 303 may also be known as mesh network nodes 301, 302, 303.

The coordinating servers 305 are shown as two coordinating servers 305*a* and 305*b*. The coordinating servers 305*a* and 305*b* may be in load-sharing mode or may be in active-standby mode for high availability. The coordinating servers 305 may be located between a radio access network (RAN) and the core network and may appear as core network to the base stations in a radio access network (RAN) and a single eNodeB to the core network, i.e., may provide virtualization of the base stations towards the core network. As shown in FIG. 3, various user equipments 311*a*, 311*b*, 311*c* are connected to the base station 301. The base station 301 provides backhaul connectivity to the user equipments 311*a*, 311*b*, and 311*c* connected to it over mesh network links 306, 307, 308, 309, 310 and 314. The user equipments may be mobile devices, mobile phones, personal digital assistant (PDA), tablet, laptop etc. The base station 302 provides backhaul connection to user equipments 312*a*, 312*b*, 312*c* and the base station 303 provides backhaul connection to user equipments 313*a*, 313*b*, and 313*c*. The user equipments 311*a*, 311*b*, 311*c*, 312*a*, 312*b*, 312*c*, 313*a*, 313*b*, 313*c* may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 311*a*, 311*b*, 311*c*, 312*a*, 312*b*, 312*c*, 313*a*, 313*b*, and 313*c*, the uplink 314 may get congested under certain circumstances. As described above, to continue the radio access network running and providing services to the user equipments, the solution requires prioritizing or classifying the traffic based at the base stations 301, 302, 303. The traffic from the base stations 301, 302, and 303 to the core network 315 through the coordinating server 305 flows through an IPsec tunnel terminated at the coordinating server 305. The mesh network nodes 301, 302, and 303 adds IP Option header field to the outermost IP Header (i.e., not to the pre-encapsulated packets). The traffic may from the base station 301 may follow any of the mesh network link path such as 307, 306-110, 306-108-109 to reach to the mesh gateway node 304, according to a mesh network routing protocol.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Specifically, the subject matter described herein applies equally to a 4G core (EPC) and 5GC, as both RATs follow the CUPS specification in 3GPP TS 29.244. Wherever an MME is described, the MME could be a 4G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

Figure 4:
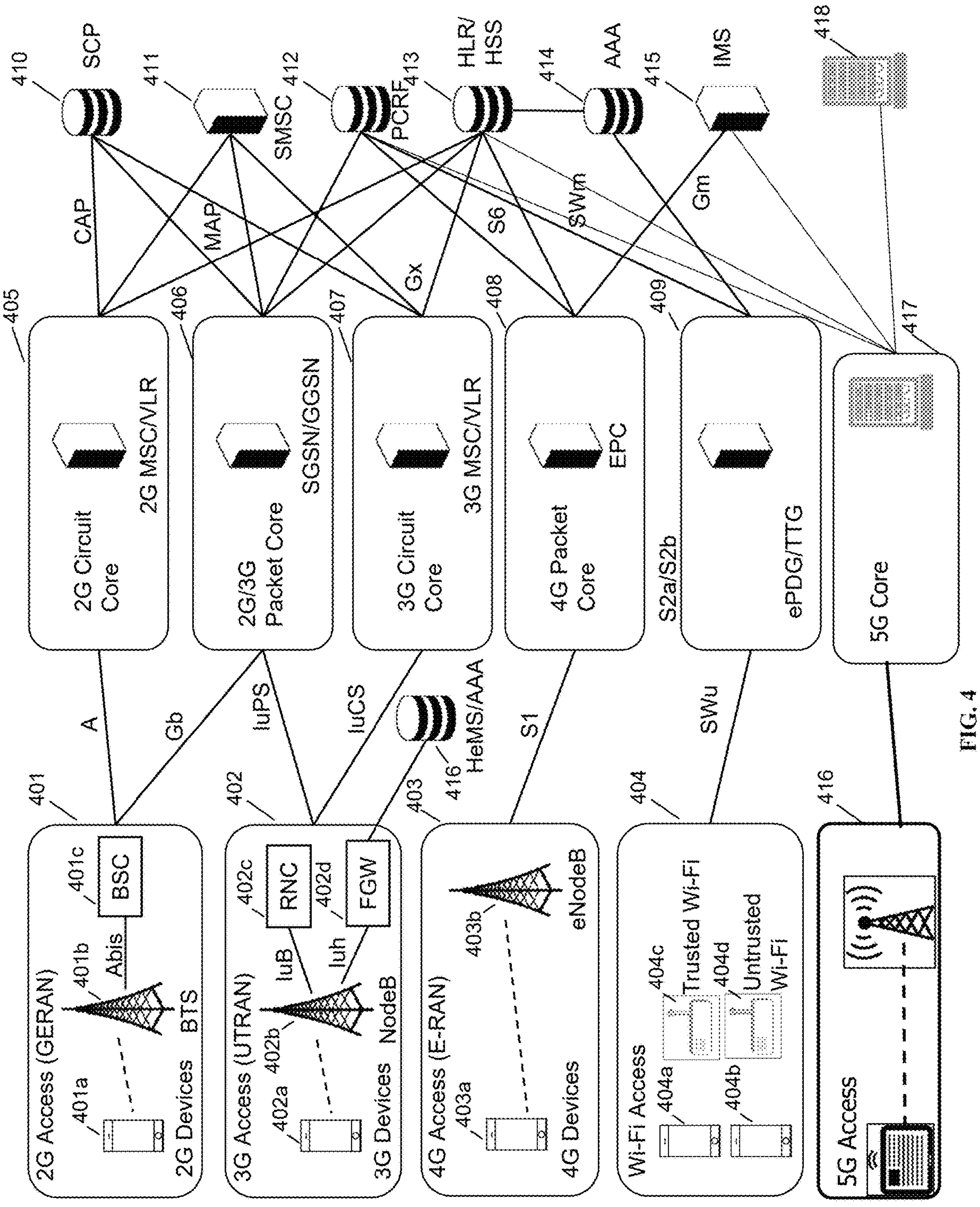
FIG. 4 is a schematic network architecture diagram for 3G and other-G prior art networks.

FIG. 4 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 401*a*, BTS 401*b*, and BSC 401*c*. 3G is represented by UTRAN 402, which includes a 3G UE 402*a*, nodeB 402*b*, RNC 402*c*, and femto gateway (FGW, which in 3GPP namespace is also known as a Home nodeB Gateway or HNBGW) 402*d*. 4G is represented by EUTRAN or E-RAN 403, which includes an LTE UE 403*a* and LTE eNodeB 403*b*. Wi-Fi is represented by Wi-Fi access network 404, which includes a trusted Wi-Fi access point 404*c* and an untrusted Wi-Fi access point 404*d*. The Wi-Fi devices 404*a* and 404*b* may access either AP 404*c* or 404*d*. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 4G core 417 is shown using a single interface to 4G access 416, although in some cases 4G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401*c* is required for Abis compatibility with BTS 401*b*, while for the 3G UTRAN, an RNC 402*c* is required for Iub compatibility and an FGW 402*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
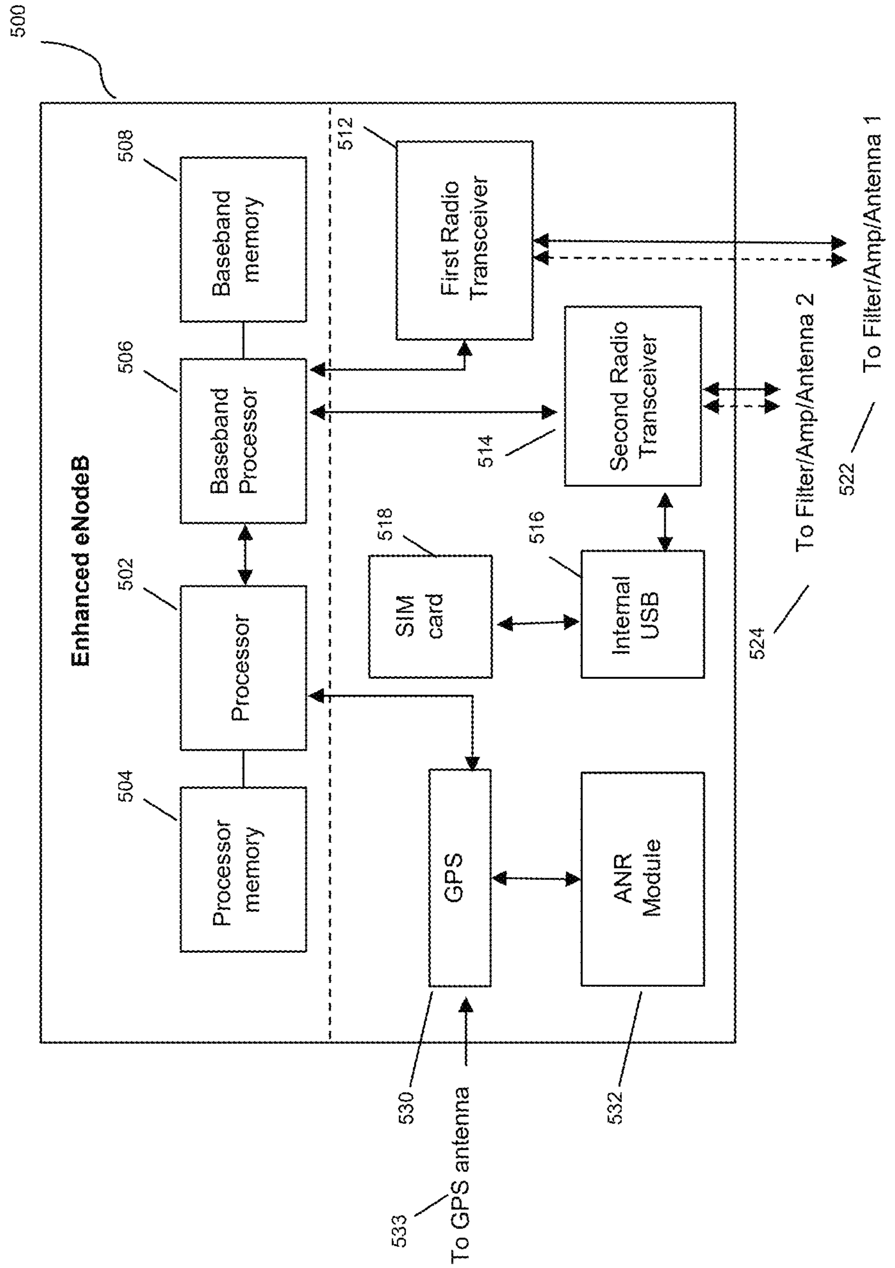
FIG. 5 is an enhanced eNodeB for performing the methods described herein, in accordance with some embodiments.

FIG. 5 is an enhanced eNodeB for performing the methods described herein, in accordance with some embodiments. Mesh network node 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
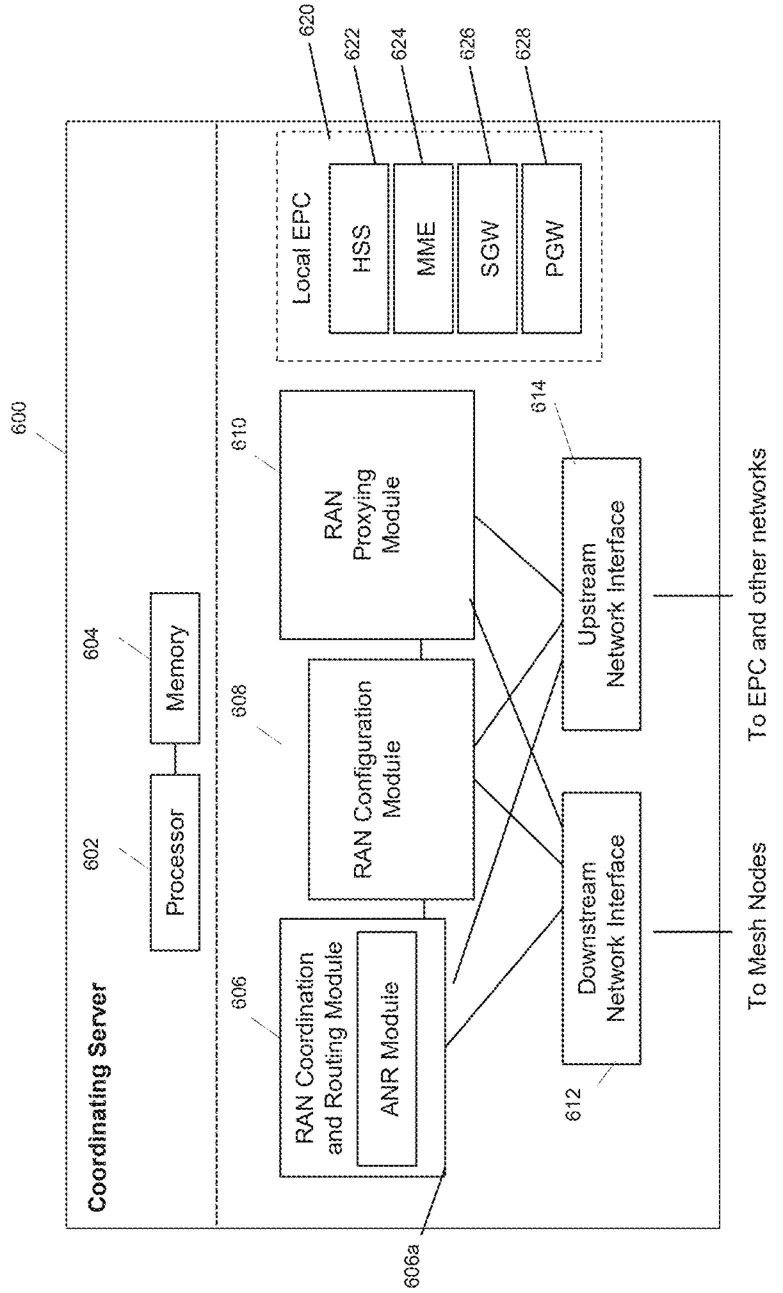
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606*a*, RAN configuration module 608, and RAN proxying module 610. The ANR module 606*a* may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing, and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In some embodiments the system may include a HetNet Gateway (HNG), and may also include a multi-RAT network and a multi-RAT core.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an objectoriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for handling data traffic during Dedicated Bearer creation at a Packet Gate Way (PGW), comprising:

receiving, at a PGW user plane from a PGW control plane, a Packet Forwarding Control Protocol (PFCP) session modify request for an existing PFCP session;

selecting, at the PGW control plane, a Forwarding Action Rules Identifier (FAR ID) corresponding to or based on an existing Packet Detection Rule (PDR) through which data traffic matching the service data flow (SDF) filters of a new the PDR (P1) identified as (P1) was passing through before creating the PDR (P1) for the existing PFCP session;

creating the Packet Detection Rule (PDR) identified as (P1), wherein the PDR (P1) includes the selected FAR ID defining the Forwarding Action Rules (FAR) to be applied on traffic matching the PDR (P1);

sending, from the PGW user plane to the control plane, a PFCP session modify response;

handling data traffic at the PGW using the selected FAR ID during Dedicated Bearer creation, wherein handling data traffic at the PGW using the selected FAR ID during Dedicated Bearer creation includes handling data traffic at the PGW using the selected FAR ID until a CREATE_BEARER_RESPONSE message is received at the PGW control plane:

updating the FAR with new forwarding parameters once the CREATE_BEARER_RESPONSE message is received at the PGW control plane; and sending new data traffic to a peer node based on the new forwarding parameters.

2. A non-transitory computer-readable medium containing instructions for handling data traffic during Dedicated Bearer creation at a Packet Gate Way (PGW) which, when executed, cause the PGW to perform steps comprising:

receiving, at a PGW user plane from a PGW control plane, a Packet Forwarding Control Protocol (PFCP) session modify request;

selecting, at the PGW control plane, a Forwarding Action Rules Identifier (FAR ID) corresponding to or based on an existing Packet Detection Rule (PDR) through which data traffic matching the service data flow (SDF) filters of a new the PDR (P1) identified as (P1) was passing through before creating the PDR (P1) for the existing PFCP session;

creating the Packet Detection Rule (PDR) identified as (P1), wherein the PDR (P1) includes the selected FAR ID defining the Forwarding Action Rules (FAR) to be applied on traffic matching the PDR (P1);

sending, from the PGW user plane to the control plane, a PFCP session modify response;

handling data traffic at the PGW using the selected FAR ID during Dedicated Bearer creation, wherein handling data traffic at the PGW using the selected FAR ID during Dedicated Bearer creation includes handling data traffic at the PGW using the selected FAR ID until a CREATE_BEARER_RESPONSE message is received at the PGW control plane;

updating the FAR with new forwarding parameters once the CREATE_BEARER_RESPONSE message is received at the PGW control plane; and sending new data traffic to a peer node based on the new forwarding parameters.

3. A Packet Gate Way (PGW) for handling data traffic during Dedicated Bearer creation, comprising:

a processor;

a memory in communication with the processor;

a user plane executed on the processor using the memory; and a control plane executed on the processor using the memory in communication with the user plane, wherein the user plane is configured to receive, from the control plane, a Packet Forwarding Control Protocol (PFCP) session modify request for an existing PFCP session;

wherein the control plane is configured to select a Forwarding Action Rules Identifier (FAR ID) corresponding to or based on an existing Packet Detection Rule (PDR) through which data traffic matching the service data flow (SDF) filters of a new the PDR (P1) identified as (P1) was passing through before creating the PDR (P1) for the existing PFCP session;

wherein the user plane is further configured to create the Packet Detection Rule (PDR) identified as (P1), wherein the PDR (P1) includes the selected FAR ID defining the Forwarding Action Rules (FAR) to be applied on traffic matching the PDR (P1);

wherein the user plane is further configured to send to the control plane, a PFCP session modify response;

wherein the PGW is configured to handle data traffic using the selected FAR ID during Dedicated Bearer creation;

wherein the PGW is further configured to handle data traffic using the selected FAR ID until a CREATE_BEARER_RESPONSE message is received at the PGW control plane;

wherein the PGW is further configured to update the FAR with new forwarding parameters once the CREATE_BEARER_RESPONSE message is received at the PGW control plane; and wherein the PGW is further configured to send new data traffic to a peer node based on the new forwarding parameters.

* * * * *